United States Patent [19]

Seel et al.

[11] Patent Number: 5,649,733

[45] Date of Patent: Jul. 22, 1997

[54] MOTOR VEHICLE HAVING A LOWERABLE ROOF STRUCTURE

[75] Inventors: Holger Seel; Kurt Schaible, both of Aidlingen; Bernhard Schenk, Boeblingen, all of Germany

[73] Assignee: Mercedes-Benz AG, Stuttgart, Germany

[21] Appl. No.: 577,101

[22] Filed: Dec. 22, 1995

[30] Foreign Application Priority Data

Dec. 22, 1994 [DE] Germany ................... 44 45 920.3

[51] Int. Cl.⁶ ................... B60J 7/20; B60R 5/04
[52] U.S. Cl. ................... 296/37.5; 296/136
[58] Field of Search ................... 296/76, 136, 37.1, 296/37.5, 37.16

[56] References Cited

U.S. PATENT DOCUMENTS

| | | | |
|---|---|---|---|
| 1,933,623 | 11/1933 | Gordon | 296/76 |
| 1,950,927 | 3/1934 | McMillan | 296/37.16 X |
| 2,060,362 | 11/1936 | Zurcher | 296/37.1 X |
| 2,552,898 | 5/1951 | Lenci et al. | 296/76 X |
| 4,932,704 | 6/1990 | Ament | 296/37.16 |
| 4,969,679 | 11/1990 | Eyb | 296/136 X |
| 5,551,743 | 9/1996 | Klein et al. | 296/136 X |

FOREIGN PATENT DOCUMENTS

| | | | |
|---|---|---|---|
| 38 29 346 | 3/1990 | Germany | 296/136 |
| 43 30 411 | 10/1994 | Germany . | |

*Primary Examiner*—Dennis H. Pedder
*Attorney, Agent, or Firm*—Evenson, McKeown, Edwards & Lenahan, P.L.L.C.

[57] ABSTRACT

In the case of a motor vehicle having a lowerable roof structure, respective roof parts pivoted into an open position, in which they release the rear passenger compartment of the vehicle, can be pivoted at least partially into a folding-top compartment in the tail-end region of the vehicle. In this arrangement, the folding-top compartment region merges directly into a trunk region covered by a tail gate. Provided between the two regions is at least one intermediate wall which can be moved into a closing-off position or open position. The intermediate wall is designed as a roller screen, a folding screen, or the like, which runs in respective lateral guides. In its closed-off position, the intermediate wall extends rearwards forming an upper boundary of the trunk region.

11 Claims, 3 Drawing Sheets

MOTOR VEHICLE HAVING A LOWERABLE ROOF STRUCTURE

BACKGROUND AND SUMMARY OF THE INVENTION

The invention relates to a motor having a lowerable roof structure and, more particularly, to a lowerable roof structure having roof parts which, when pivoted into an open position in which they release the rear passenger compartment of the vehicle, can be pivoted at least partially into a folding-top compartment in the tail-end region of the vehicle.

A motor vehicle of the above-mentioned type is known from German Patent document DE 43 30 411 C1. The tail-end stowage space of the vehicle is subdivided, an intermediate wall designed as a fixed partition, into a front folding-top compartment and a trunk located behind the folding top compartment. In order, if required, to be able to increase the size of the trunk by the volume or space of the folding top compartment, which is empty when the roof is closed, the intermediate wall can be swung down from its approximately vertical closing-off position into an approximately horizontal open position. The intermediate wall is swung down onto the base of the folding-top compartment.

However, a disadvantage of the vehicle is that the operation of the swing-action intermediate wall during conversion of the tail-end stowage space is relatively laborious and difficult. There is also a high risk that unskilled operators may get their fingers jammed.

Furthermore, since the intermediate wall of the known vehicle has to be of an extremely flexurally rigid design, a favorable lightweight construction for the intermediate wall would only be possible with high production costs.

In addition, the known intermediate-wall arrangement gives rise to a considerable overall length of the tail-end stowage space. This has the result that the intermediate-wall arrangement is not suitable for vehicles having a short tail end.

Furthermore, German Patent document DE 38 29 346 A1 discloses a motor vehicle having a lowerable folding-top. In this case, the folding top compartment projects from above into a trunk of the tail-end of the vehicle. The peripheral walls of the folding-top compartment consist here of elastically compliant material, e.g., of a woven material, and can be drawn out and pushed together in the manner of a bellows. When the folding top is closed, the volume of the trunk can thus be increased by raising the base of the folding-top compartment. The peripheral walls are pushed together, while folding, in the process. However, the folding-top compartment, which has thus been reduced in volume, takes up considerably more space than an intermediate wall which subdivides the hollow cross-section of the trunk. In addition, the variable-volume folding-top compartment uses a different design principle from an intermediate-wall arrangement since the hollow volume of the folding-top compartment itself is not used to supplement the volume of the trunk. Additionally, the folding-top compartment with variable volume would also not be suitable for vehicles with a short tail end, if adequate residual trunk space is also to be provided when the top is lowered.

There is therefore needed a motor vehicle having a lowerable roof structure, generally of the above-described type, such that the intermediate wall can be produced in a cost-effective lightweight construction. It is the intention that a non-problematic operation of the intermediate wall be possible, and that the suitability of the intermediate-wall arrangement for vehicles with a short tail end be considerably improved.

These needs are met according to the present invention by a motor vehicle having a lowerable roof structure having roof parts which, when pivoted into an open position in which they release the rear passenger compartment of the vehicle, can be pivoted at least partially into a folding-top compartment in the tail-end region of the vehicle. The region of the folding-top compartment merges directly into a trunk region covered by a tail gate. Provided between the two regions is at least one intermediate wall which can be moved into a closing-off position or open position. The intermediate wall is installed to extend transversely with respect to the longitudinal center plane of the vehicle and is supported in the region of the lateral bodywork walls. The intermediate wall, in its closed-off position, extends from the base region of the folding-top compartment up to the upper border region of the boot region. In its open position, the intermediate wall is lowered to the base region. The intermediate wall is in the form of a roller screen, a folding screen, or the like, and is supported in respective lateral guides. In its closed-off position, the intermediate wall extends rearwards as an upper boundary of the trunk region.

Other objects, advantages and novel features of the present invention will become apparent from the following detailed description of the invention when considered in conjunction with the accompanying drawings.

DETAILED DESCRIPTION OF THE DRAWINGS

Figure 1:
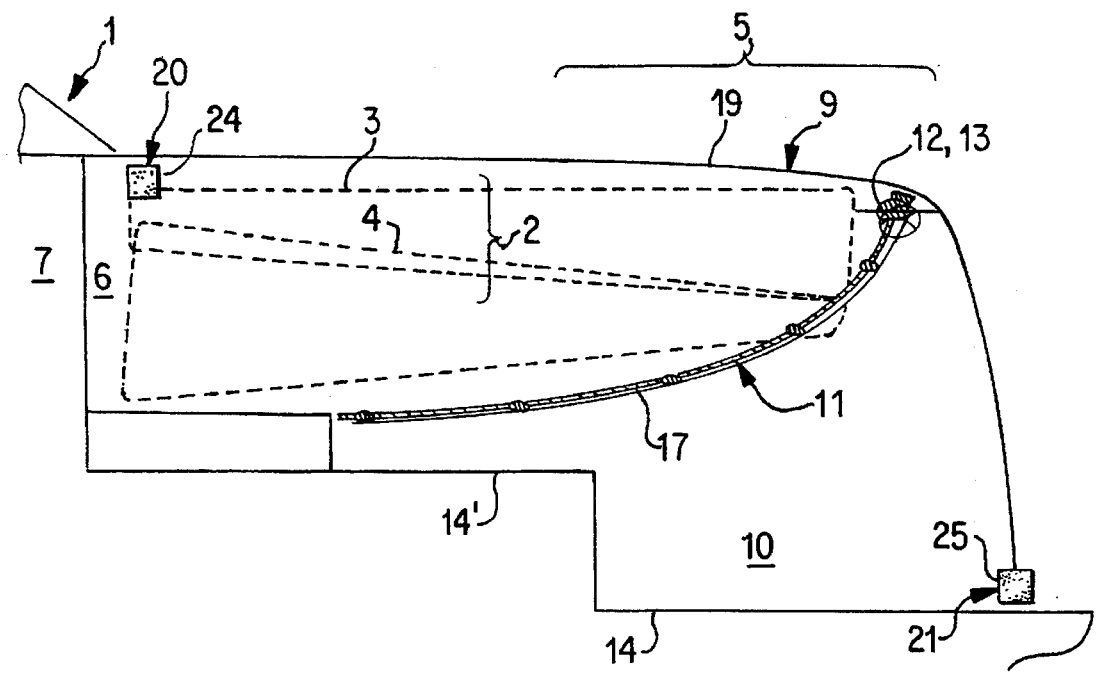
FIG. 1 is a schematic side view of the tail-end region of a vehicle, with an intermediate wall located in the closed position between a folding-top compartment region and a trunk region.

Illustrated in a basic schematic representation in FIG. 1 is a motor vehicle, designated generally by reference number 1, which is designed as a hard-top vehicle and has a lowerable roof structure 2. The roof structure 2 has roof parts 3 and 4, illustrated by a dotted line, that are pivoted into a folding-top compartment 6 in the tail-end region 5 of the vehicle. In the open position of the roof structure 2, the rear passenger compartment 7 region of the vehicle (FIG. 5) is released for open-top driving. It goes without saying that the roof structure 2 may alternatively also be a lowerable soft top or the like. All that matters for the invention is that a roof, collapsed in a compact state, can be lowered at least partially into a tail-end storage space of the motor vehicle.

Figure 2:
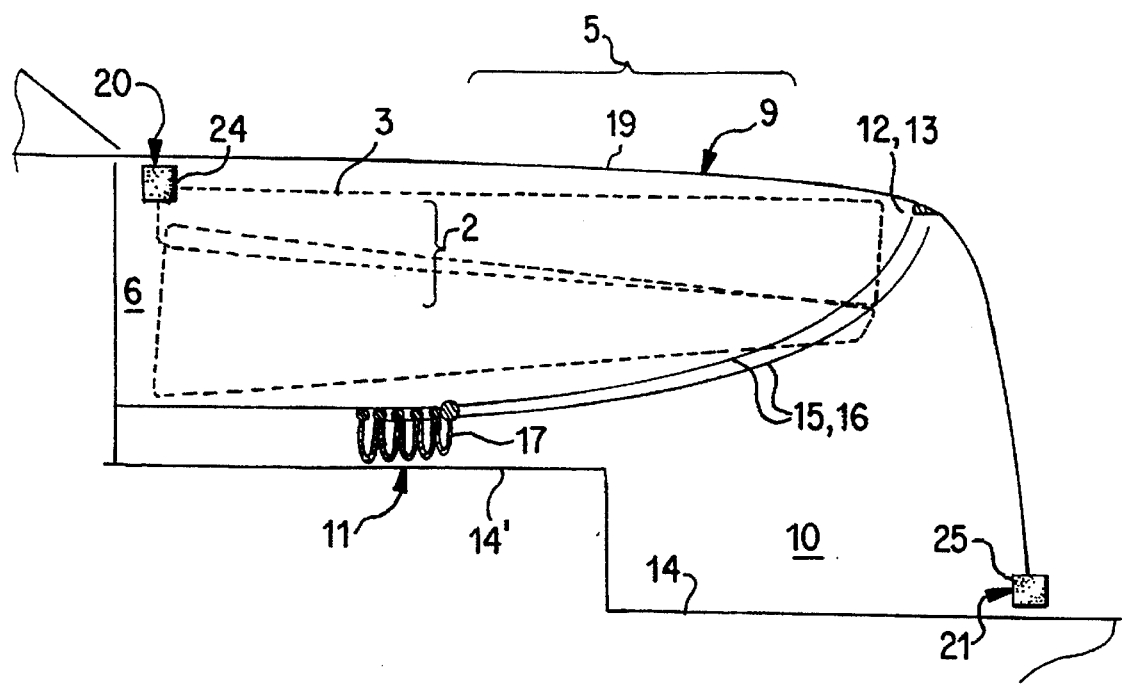
FIG. 2 is a schematic side representation similar to FIG. 1, with the intermediate wall in the open position.

The enlarged representations, in detail form, of the tail-end region 5 in accordance with FIGS. 1 and 2 illustrate that the region of the folding-top compartment 6 merges directly into a trunk region 10 covered in a manner known per se by a tail gate 9. There is provided, between the two regions 6 and 10, at least one intermediate wall 11 which can be moved into a closing-off position or an open position.

In certain preferred embodiments, the intermediate wall 11 is arranged essentially perpendicularly with respect to the longitudinal axis of the vehicle (which corresponds to the plane of the representation), and is thus arranged installed so as to extend transversely with respect to the longitudinal center plane of the vehicle. The intermediate wall is supported in the region of the two opposing lateral bodywork walls 12, 13.

In this arrangement, the folding-top compartment 6 is located directly behind the rear passenger compartment 7 of the vehicle and extends, virtually over the entire length of the tail-end region 5 of the vehicle, up to a rear upper corner region at the rear tail-end termination of the vehicle. Consequently, a trunk region 10, which is located in front of the rear tail-end termination of the vehicle and is always available, is covered over by the rear length region of the folding-top compartment 6. The tail-end region 5 is thus only slightly longer than the folding-top compartment 6, since the trunk region 10 is located beneath the folding top compartment. Nevertheless, in order to provide sufficient trunk space in the trunk region 10, the base region 14 of the trunk region 10 is located at a considerably lower lever than the base region 14' of the folding-top compartment 6. As a result, the base region 14' drops down approximately to bumper level. A high step to the base region 14 is formed in the process.

In order for the trunk region 10 to be loaded conveniently from the rear, the intermediate wall 1 exhibits, in its closing-off position, a covering or closing contour which, starting from the upper corner region of the tail-end region 5 of the vehicle, extends obliquely downwards towards the front. As a result, the loading-space opening of the trunk region 10 widens upwardly towards the rear. After the oblique length region of the intermediate wall 11, the covering contour merges, via a bent-off or angled-off portion, into an approximately horizontal or barely inclined length section which adjoins the upper side of the base region 14', or the covering thereof, with the surfaces being flush.

Figure 2A:
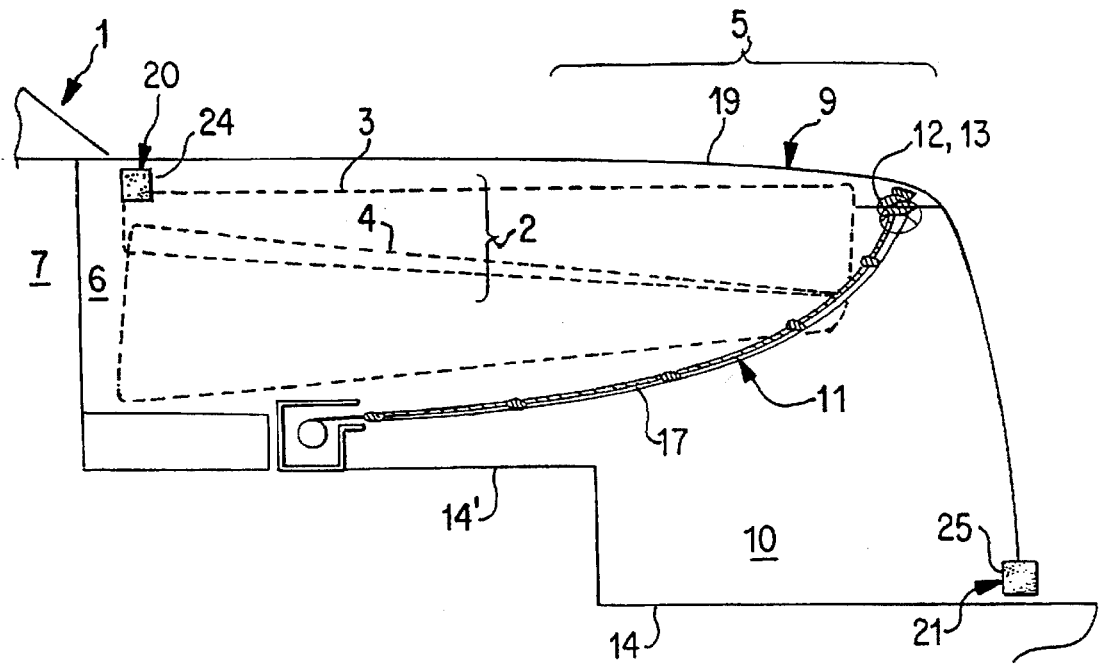
FIGS. 2a and 2b illustrate different embodiments of the intermediate wall according to the present invention.

In the embodiment represented in accordance with FIGS. 1 to 5, the intermediate wall 11 is designed as a flexible closing-off part, running in respective lateral guide profiles 15, 16. The intermediate wall is in the form of a roller screen (FIG. 2A) or a folding screen 17 (FIG. 2). Accordingly, the guide profiles 15 and 16 have a mirror-symmetrical arrangement. The guide profiles 15, 16, which predetermine the contour of the cover extend rearward from the base region 14' of the folding-top compartment 6 up to the upper corner region of the tail-end region 5 of the vehicle. The folding screen 17 exhibits a plurality of support bars distributed over its length. The support bars extend over the entire width of the folding screen 17 and are connected to the woven-fabric web of the folding screen 17 such that they cannot move relative thereto. The support bars may be of an oval cross-section (FIG. 1) or else a round cross-section (FIG. 2). Each of the support bars engage, by means of their ends, into the guide profiles 15 and 16 arranged opposite one another.

In a particularly advantageous design, the guide profiles 15 and 16 are arranged so as to form a closing contour which extends in the form of an arc from the base region 14' of the folding-top compartment 6 to the upper border region of the trunk 10. This achieves a particularly smooth sliding of the folding screen 17 along the guide profiles 15 and 16. In addition, a particularly favorable separation of the two regions 6 and 10 from one another is obtained.

Furthermore, a fold bar is fastened at the rear termination of the folding screen 17. The fold bar extends over the entire width of the woven-fabric web and is of a larger round or oval cross-section than the carrying bars. Here, the folding screen 17 can be conveniently gripped and uniformly pushed together or drawn out. In the pushed-together folded position, the length sections held between adjacent support bars sag downwards as arcuate round folds and can be pushed close together in the manner of a bellows (FIG. 2). Consequently, the folding screen 17 takes up only a small amount of space.

In order to fix the drawn-out folding screen 17 in its closed-off position, its fold bar is fixed at the upper end region of the guide profiles 15 and 16 by hooking-in or the like.

Figure 2B:
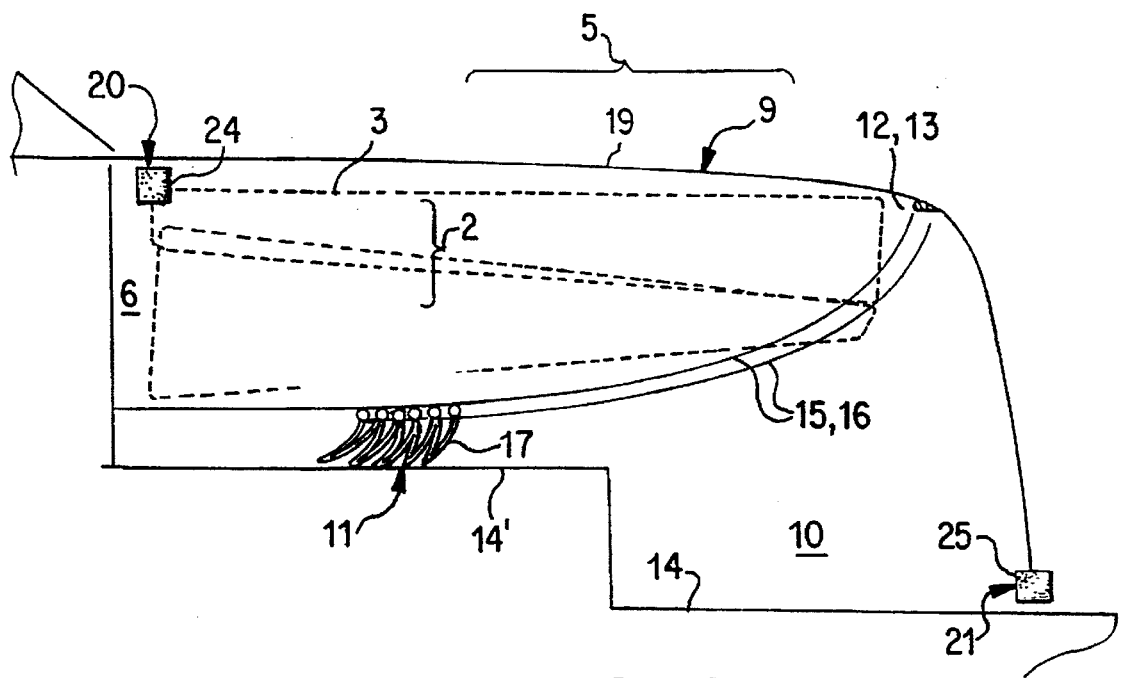

Because the support bars reinforce or stiffen the woven-fabric web of the folding screen 17, and the folding screen 17 is not over loaded for example during braking of the vehicle by luggage deposited in the trunk region 10, the flexural stability of the folding screen 17 is usually sufficient. If greater requirements are to be placed on the stability of the intermediate wall 11, it is conceivable to provide, instead of the folding screen 17 with a woven-fabric web, an intermediate wall comprising a plurality of rigid lamellae (FIG. 2B), e.g., made of plastic, which could be pushed together into a stacked position. Drawing out the lamellae stack would form an intermediate wall with a rigidity similar to a single-piece covering panel. The closing or covering contour described could remain intact here since the lamellae could be guided by the guide profiles 15 and 16.

Figure 3:
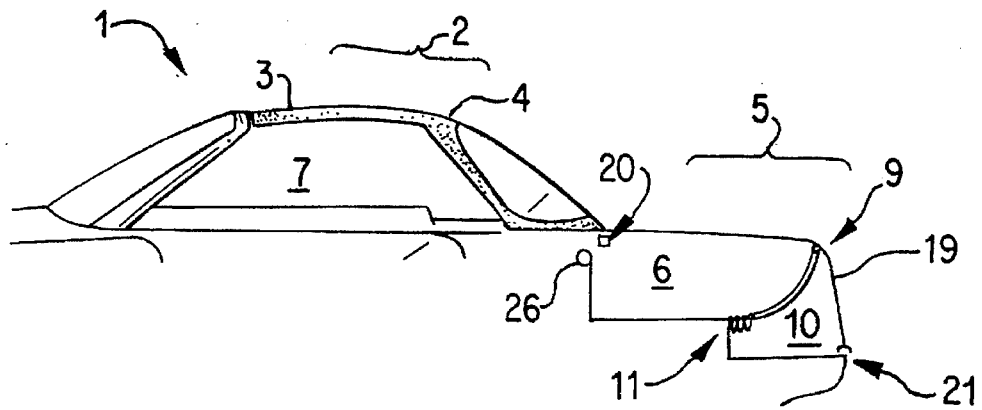
FIG. 3 is a basic representation, partially in section, of a hard-top vehicle having a roof structure located in the closed position.
Figure 4:
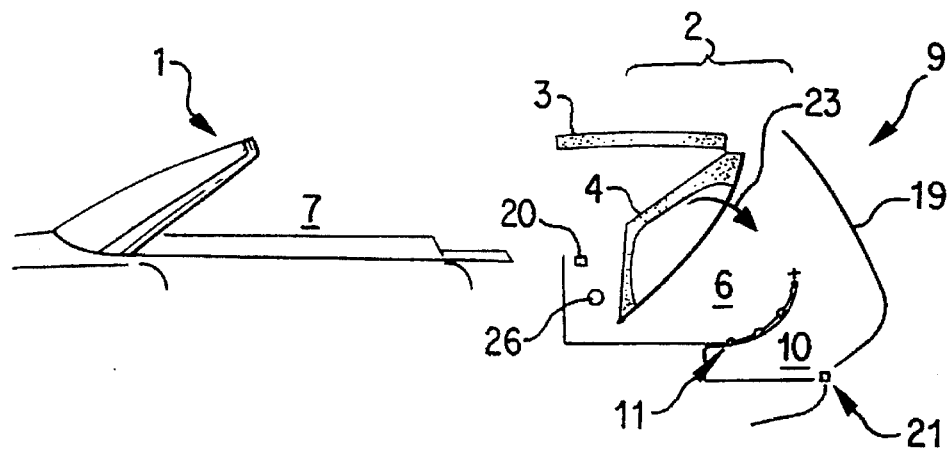
FIG. 4 illustrates a respective movement phase of the two-part roof structure of the vehicle during pivoting into the tail-end receiving space.
Figure 5:
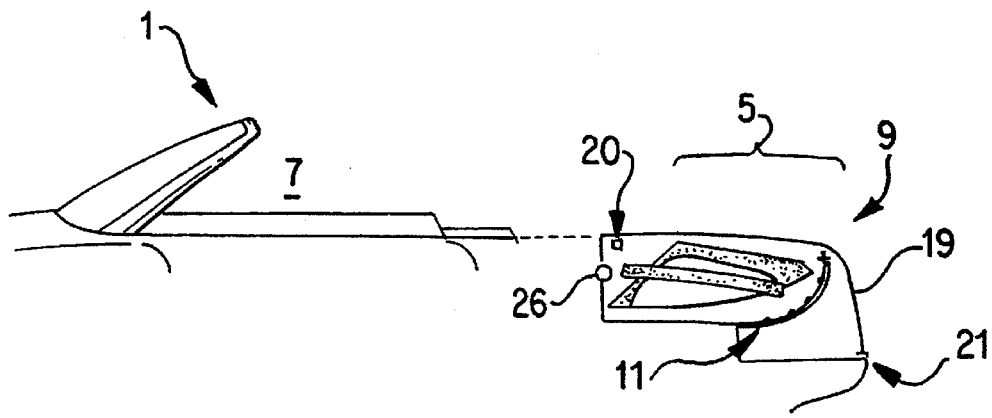
FIG. 5 illustrates a further respective movement phase of the two-part roof structure of the vehicle during pivoting into the tail-end receiving space.

The representations of different movement phases of the roof structure 2 in FIGS. 3 to 5 illustrate that in a preferred embodiment, the folding-top compartment 6 and trunk 10 are, together, covered by the tail gate 9. The tail gate 9 is designed as a two-way pivot gate 19. In this arrangement, the two-way pivot gate 19 may optionally be displaced, about a front pivot pin 20 or a rear pivot pin 21 located in the vehicle end region, into two opposite open positions. The representation in accordance with FIG. 4 represents the pivot position of the two-way pivot gate 19 during movement about the rear pivot pin 21. The pivot members 24 and 25 necessary for the above-described pivot movements of the two-way pivot gate 19 are not illustrated in any more detail here.

In the closed position of the roof structure 2 as presented in FIG. 3, the folding-top compartment 6 is in an empty state, with the result that the intermediate wall 11, displaced into the open position in the form of the folding screen 17, permits the folding-top compartment 6 and the trunk 10 to be fully utilized as transporting and storage space for goods.

Once the goods have been removed at least from the region of the folding-top compartment 6, the roof structure 2 can be pivoted, by the above-described pivot movement, about a tail-end pivot pin 26 (arrow 23 into the folding-top compartment 6. The folding compartment 26 is closed by way of the two-way pivot gate 19 (FIG. 5). In this packed position, characteristic of the open-top driving state of the roof structure 2, it is only the trunk 10 which can be utilized for the goods. The intermediate wall 11 or the folding screen 17 is moved into the closed position (FIG. 1, FIG. 5) in order that the roof structure 2 in the open-top compartment is covered in a manner which protects it from dust and impact. In this arrangement, access to the trunk 10 is possible in a manner known per se, by pivoting the way pivot gate 19 about the front pivot pin 20.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle having a lowerable roof structure including roof parts which pivot at least partially into a folding-top compartment in a tail-end region of the vehicle so as to release a rear passenger compartment of the vehicle in an open position, said folding-top compartment having a region which merges directly into a trunk region covered by a tail gate of the vehicle, comprising:

at least one intermediate wall provided between said folding-top compartment region and said trunk region, said at least one intermediate wall being movable into a closing-off position or an open position; wherein said intermediate wall is supported in a region of lateral walls of a body of the vehicle so as to extend transversely with respect to a longitudinal center plane of the vehicle;

wherein said intermediate wall extends from a base region of the folding-top compartment up to an upper border region of said trunk region in the closed-off position and, in the open position, the intermediate wall being lowered to the base region; and lateral guides provided to guide said intermediate wall, wherein said intermediate wall is one of a roller screen and a folding screen and further wherein said intermediate wall extends rearward as an upper boundary of said trunk region in the closed-off position.

2. A motor vehicle according to claim 1, wherein said trunk region is substantially covered by said intermediate wall when in the closed-off position.

3. A motor vehicle according to claim 2, wherein said intermediate wall extends up to a rear upper corner region of the tail-gate region of the vehicle in the closed-off position, said intermediate wall running obliquely upwards at least in a rear length region of said intermediate wall.

4. A motor vehicle according to claim 3, wherein said lateral guides are in the form of guide profiles forming a closing contour extending in an arcuate shape from the base region of the folding-top compartment to the upper border region of the trunk.

5. A motor vehicle according to claim 1, wherein said base region of the folding-top compartment merges into a lower-level base region of the trunk region such that at least one step is formed, and further wherein said intermediate wall adjoins an upper edge of the step of the base region such that surfaces of the base region and said intermediate wall are substantially flush.

6. A motor vehicle according to claim 1, wherein said intermediate wall comprises a plurality of rigid shell parts connected in a foldable manner.

7. A motor vehicle according to claim 1, wherein said folding-top compartment region and said trunk region are together covered via a two-way pivot gate forming said tail gate.

8. A motor vehicle according to claim 7, wherein said two-way pivot gate is optionally movable into two opposite open positions via a front pivot pin and a rear pivot pin located in the tail-end region.

9. A motor vehicle according to claim 8, further comprising pivot members which define said front pivot pin and said rear pivot pin, wherein said two-way pivot gate is supported in each case via said pivot members in a front upper border region of the folding-top compartment and in the rear lower region of said trunk.

10. A motor vehicle according to claim 1, wherein said intermediate wall is reinforced by support bars extending over the width of said intermediate wall, said support bars having ends which run in said lateral guides.

11. A movable partition for a tail-end region of a motor vehicle, comprising:

a folding-top compartment and a trunk region adjacent one another in the tail-end region of the vehicle;

an intermediate wall in the form of one of a roller screen and a folding screen arranged so as to divide the tail-end region into said folding-top compartment and said trunk region;

guide profiles arranged opposite one another at lateral ends of said tail-end region of the vehicle, said intermediate wall being supported in said guide profiles such that, in a partitioning position, said intermediate wall extends rearward providing an upper boundary of the trunk region.

* * * * *